United States Patent [19]

Sperner

[11] 4,076,434
[45] Feb. 28, 1978

[54] ELASTIC JOINT

[75] Inventor: Peter Sperner, Erfstadt-Lechenich, Germany

[73] Assignee: Clouth Gummiwerke Aktiengesellschaft, Cologne, Germany

[21] Appl. No.: 736,714

[22] Filed: Oct. 28, 1976

[30] Foreign Application Priority Data

Oct. 29, 1975 Germany .................. 2548350

[51] Int. Cl.² .............................................. F16B 1/00
[52] U.S. Cl. .................................. 403/224; 403/120; 403/287; 248/22; 296/35 R
[58] Field of Search .............. 248/21, 22, 358 R; 296/35 R; 403/220, 224, 225, 228, 223, 287, 113, 120; 267/57.1 R, 63 R

[56] References Cited

U.S. PATENT DOCUMENTS

| 2,019,052 | 10/1935 | Lord ........................... 248/358 R |
| 2,208,709 | 7/1940 | Tjaarda ......................... 296/35 R |
| 2,367,826 | 1/1945 | Kubaugh ...................... 248/358 R |
| 2,538,955 | 1/1951 | Efromson et al. ............. 248/358 R |
| 2,579,918 | 12/1951 | Freeman ..................... 248/358 R X |
| 2,999,707 | 9/1961 | Kniepkamp et al. .............. 403/225 |

Primary Examiner—Andrew V. Kundrat
Attorney, Agent, or Firm—Montague & Ross

[57] ABSTRACT

A joint between two bodies of limited relative mobility, such as the wheelbase and the chassis of a vehicle, comprises a male member or stem fastened to one body and a female member or socket fastened to the other body, the two members being interfitted with interposition of a resilient ring allowing universal elastic deformation. At least one member is secured to its body through a pivotal connection permitting a limited relative swing in a plane including the joint axis, the swing being resisted by a resilient cushion. This affords increased elastic deformability in a preferred direction, e.g. longitudinally of the vehicle.

4 Claims, 4 Drawing Figures

ELASTIC JOINT

FIELD OF THE INVENTION

My present invention relates to an elastic joint designed to interconnect two bodies, such as the wheelbase and the chassis or frame of a vehicle, with freedom of limited relative mobility.

BACKGROUND OF THE INVENTION

In automotive suspension systems it is customary to use elastic joints each comprising a pair of members rigid with their associated bodies, i.e. the wheelbase and the chassis, which are resiliently interconnected so as to provide a universal elastic restoring force uniformly resisting a relative displacement of the two bodies in any direction.

Such joints with uniform modulus of elasticity, however, do not respond optimally to actual driving conditions requiring different degrees of relative mobility in mutually orthogonal directions. Thus, a tall vehicle such as a truck should have a suspension have a suspension capable of absorbing road shocks as well as accelerations in the direction of travel but should not sway excessively in a direction transverse thereto.

OBJECT OF THE INVENTION

It is, therefore, the object of my present invention to provide a joint of the general type described, especially but not exclusively for vehicular suspensions, whose stiffness varies substantially between two different directions of deformation.

SUMMARY OF THE INVENTION

I realize this object, in accordance with the instant invention, by pivotally connecting at least one of the joint members with the associated body for limited swinging in a predetermined plane, thereby increasing the relative mobility of the bodies in a direction parallel to that plane as compared with a direction perpendicular thereto in which the pivotal connection is ineffectual.

Advantageously, pursuant to a more particular feature of my invention, the swing in the aforementioned plane is elastically resisted by resilient cushioning means interposed between the pivoted member and its associated body.

BRIEF DESCRIPTION OF THE DRAWING

The above and other features of my invention will now be described in detail with reference to the accompanying drawing in which.

SPECIFIC DESCRIPTION

Figure 1:
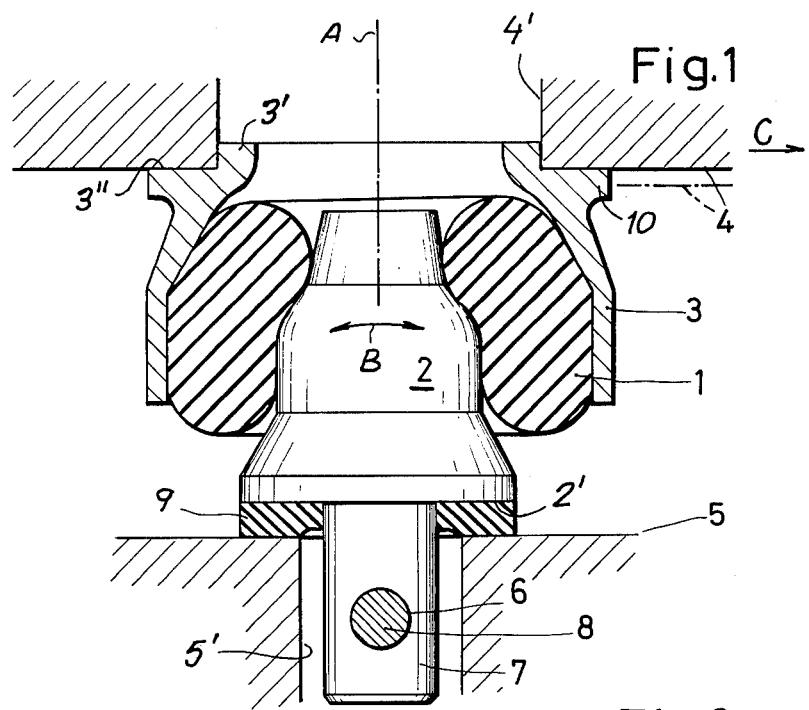
FIG. 1 is an axial sectional view of a joint embodying the invention.

In FIG. 1 I have shown part of an upper body 4, assumed to be a vehicle frame or chassis, and of a lower body 5, assumed to be a wheelbase, together with one of several joints through which the upper body 4 is elastically supported on the lower body 5. The joint comprises a female member or socket 3 with a reduced neck 3' fitting closely into a recess 4' on the undersurface of chassis 4, this neck being provided with a peripheral flange 10 forming a shoulder 3" which rests against that surface. The flange has a set of mounting holes 10', FIG. 2, for the passage of nonillustrated screws securing the socket member 3 to the chassis 4.

Socket 3 has a vertical axis A on which a male member 2, in the form of a stem with a bell-shaped peripheral surface, is normally centered. An annular clearance between members 2 and 3 is occupied by a generally toroidal ring 1 of rubber or other elastomeric material which resiliently tends to maintain them in their coaxial position. Ring 1, converging upwardly around the stem 2, supports the body 4 on the body 5 through the intermediary of members 2 and 3; because of its isotropic character, this ring resists relative lateral shifts and tilts of the two members in all directions with the same degree of elasticity.

In accordance with my present invention, stem 2 has an extension in the form of a coaxial stud 7 penetrating into a recess 5' in the upper surface of body 5, the stud being received in that recess with enough play to enable a limited swinging of the stem in a plane P (FIG. 2) perpendicular to a horizontal shaft 8 which traverses a bore 6 in stud 7 and spans the recess 5'. Thus, member 2 is articulated to body 5 in a manner enabling the entire joint, together with body 4, to tilt to either side of axis A — as indicated by arrow B — without significantly deforming the ring 1. Such a swing, however, is resisted by an annular cushion or pad 9 of elastomeric material interposed between the upper surface of body 5 and a confronting shoulder 2' of stem 7, this cushion surrounding the stud 7. The modulus of elasticity of cushion 9 may or may not be the same as that of ring 1; in either case the effective flexibility of the joint will be greater in the swing plane P, which includes the axis A, than transversely thereto.

By a combined deformation of the two inserts 1 and 9, the chassis 4 may move substantially horizontally (arrow C) in the direction of vehicle motion so that its lower surface remains more or less parallel to itself as indicated in dot-dash lines in FIG. 1, e.g. upon sudden deceleration. Naturally, all the joints of the vehicular suspension system will have their swing axes parallel to one another.

Figure 2:
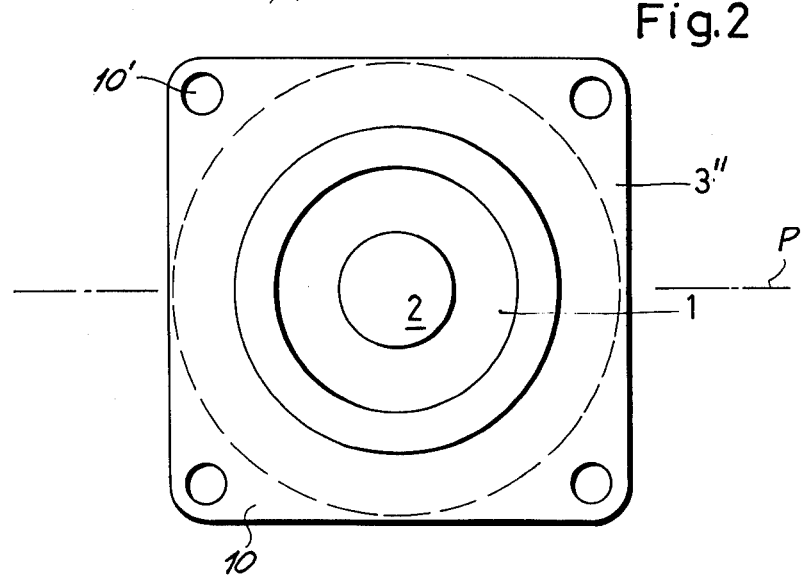
FIG. 2 is a top plan view of the joint of FIG. 1.
Figure 3:
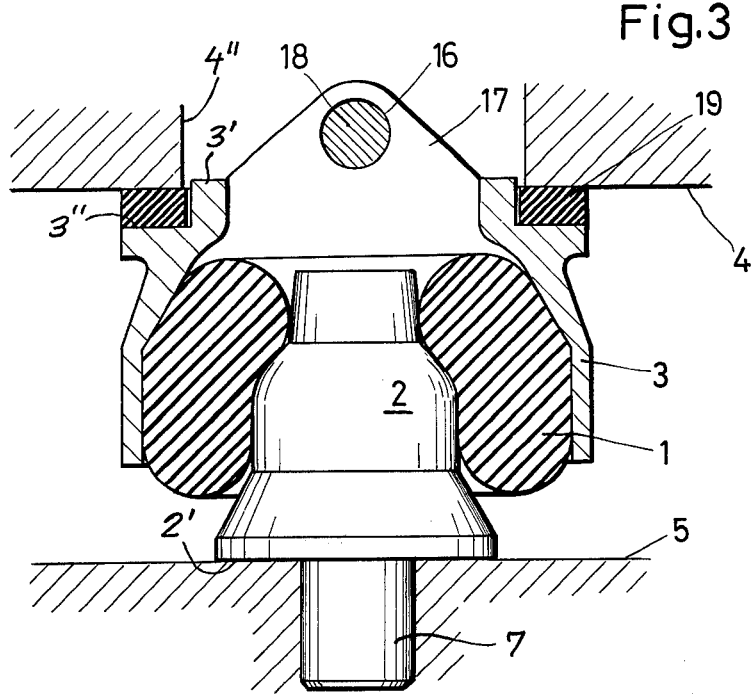
FIG. 3 is a view similar to FIG. 1, showing a modified joint according to the invention.
Figure 4:
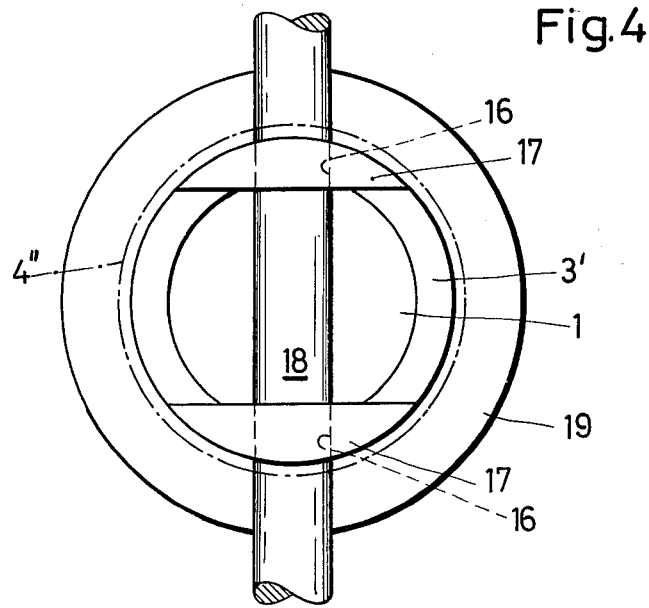
FIG. 4 is a top plan view of the embodiment of FIG. 3.

In FIGS. 3 and 4 I have shown a kinematic inversion of the assembly of FIGS. 1 and 2. Here, the shoulder 2' of stem 2 sits firmly on the upper surface of body 5 while its stud 7 (lacking the bore 6 of FIG. 1) is received with tight fit in that body. The lower surface of body 4, however, now has a recess 4" whose outline has been indicated in phantom lines in FIG. 4 and which receives a pair of lugs 17 extending upwardly from member 3. The neck 3' of member 3 projects only slightly, and with play, into the recess 4" so that this member is limitedly swingable, in an axial plane, with reference to body 4 about a horizontal shaft 18 which spans the recess 4" and traverses a pair of aligned holes 16 in lugs 17. The swing is resisted by an annular elastomeric cushion 19 which rests on shoulder 3" of member 3, in contact with body 4, and surrounds the neck 3'. The operation of this embodiment is essentially the same as that of the joint shown in FIGS. 1 and 2.

If desired, both members 2 and 3 may be pivotally connected with their associated bodies 5 and 4 via respective articulations 7, 8 and 17, 18, with interposition of pads 9 and 19 to cushion the swing in the preferred direction.

It will be apparent that the chassis 4 can be readily lifted off, with its socket members 3, from the wheelbase 5 to which the stems 2 are fixedly or pivotally attached.

I claim:

1. In an assembly of a lower body and an upper body interconnected with limited relative mobility by at least one elastically deformable joint, the improvement wherein said joint comprises:
   a first member centered on a substantially vertical axis and secured to one of said bodies;
   a second member substantially coaxial with said first member;
   a pivotal connection linking said second member with the other of said bodies for limited relative swinging in a predetermined plane including said axis;
   a resilient coupling between said members enabling omnidirectional relative tilting thereof against a substantially uniform elastic restoring force; and
   resilient cushioning means interposed between said second member and said other of said bodies for limiting the swing in said plane, said pivotal connection preventing any relative movement of said second member and said other of said bodies in a direction perpendicular to said plane whereby the resistance to relative displacement of said bodies in a direction parallel to said plane is less than in said perpendicular direction.

2. The improvement defined in claim 1 wherein said members include a socket centered on said axis and a stem normally aligned with said axis received with clearance in said socket, said coupling comprising a generally toroidal insert of elastomeric material in said clearance.

3. The improvement defined in claim 2, wherein said other of said bodies has a substantially horizontal surface forming a recess traversed by a horizontal pin constituting said pivotal connection, said second member being provided with an axial extension received in said recess and articulated to said pin.

4. The improvement defined in claim 3 wherein said second member has a shoulder confronting said surface and spanning said recess, said cushioning means comprising an elastomeric ring between said surface and said shoulder surrounding said extension.

* * * * *